United States Patent Office 3,494,871
Patented Feb. 10, 1970

3,494,871
CHEMILUMINESCENT AEROSOLS
Clarence Clapp, Milford, Conn., and Dan W. Follmer, Garden Grove, Calif., assignors to Aerosol Techniques Incorporated, Bridgeport, Conn., a corporation of New York
No Drawing. Filed Jan. 3, 1966, Ser. No. 517,999
Int. Cl. C09k 1/02, 3/30
U.S. Cl. 252—188.3                    8 Claims

ABSTRACT OF THE DISCLOSURE

An aerosol dispensable luminescent agent is provided which upon delivery disperses into fine particles. The luminescent agent is N,N,N',N' tetrakis (dimethyl amino) ethylene.

---

This invention has to do with novel aerosol compositions capable of significant light emission when deposited on surfaces in exposure to air.

Our general object is to provide packaged aerosol compositions of the character later described, which possess the distinctive qualities and properties of controllably extended luminescence when deposited by gaseous propellant in spray or more condensed, e.g. foam-like, form.

The present luminescent aerosols may be employed for any of various purposes served by imparting luminescence to objects or areas upon which the aerosols may be deposited by simple spray application. As examples, such applications may be used for signaling purposes in darkness by deposition of the aerosol on water or any solid surfaces in exposure to air, or in substitution for conventional means of illumination to produce light at intensities sufficiently great for visual identification of objects, subjects to be read or otherwise examined, or for more general location marking or signaling.

The invention employs a chemiluminescent light source or agent which may be formulated in areosol compositions to have as applied to surfaces in exposure to air, light intensities and effective durations either or both of which are variable to suit particular purposes. As will appear, when packaged in chemically stable relation with selected propellant, the chemiluminescent agent may itself be useable for some purposes of illumination. However, most generally it is desirable to compound the agent in admixtures, solutions or dispersions in order to provide for the degrees of intensity and duration controls required of most application.

The normally liquid compound N,N,N',N' tetrakis (dimethyl amino) ethylene has the unique property of distinct chemiluminescence when exposed to air, and particularly when given extended surface exposure. This compound, hereinfater referred to as the luminescent agent, being a strong reducing agent, undergoes oxidation upon exposure to air, with emission of light in the green-blue spectrum. We have determined that when subjected to particle division in aerosols, this agent becomes especially effective in its light emission and ability to have sustained luminescence.

Accordingly, the invention contemplates packaging this luminescent agent with gaseous or at least partially liquefied normally gaseous propellant, in any suitable aerosol container that may be equipped with a conventional discharge or spray valve, so that the agent undergoes division into fine particles upon delivery from the container. Such particle division may be enhanced by the use of a propellant composition in which the agent has at least partial solubility, thus causing the propellant upon release to disrupt the agent particles by expansion from dissolved state. Of particular importance is the requirement that the packaged agent be stable in the presence of the propellant (as well as any additives) and therefore the propellant is selected to be unreactive with the agent.

As indicated, for most purposes it is desirable to admix the agent and propellant with one or more additives which serve their functions by reason of essentially physical relationships with the agent, or agent and propellant, and therefore may be regarded generally as diluents particularly since they affect the state of division and retention of the agent particles as deposited. Such diluents in the packaged state of the total composition may be in the category of finely divided solid particles, or essentially liquid or viscous materials in dissolved or undissolved state which become essentially solid upon dispersion, or the diluent may be of a composition which becomes essentially liquid or viscous when deposited from the aerosol dispersion. A principal function of such diluents is to serve as carriers for the luminescent agent, causing it to be retained in divided and an extended surface exposure state when deposited, and thus to have early higher illumination intensity by reason of more rapid oxidation. However in so affecting the agent the diluent may also serve to mask the agent against too rapid oxidation, and thereby prolong its luminescent life.

Good results have been achieved using a combination of diluents, one being in the category of finely divided solids dispersed or dispersible in the liquid phase of the packaged composition, and the other being in the class of binders, so termed by reason of their ability to bind or adhere the sprayed solid particles to surfaces. Thus the binder may be any of various materials chemically inert to the agent and which from admixture or solution with the container liquid phase, will deposit with the sprayed solid particles to adhere them to surfaces.

The packaged liquid system may also include solvent or solvent mixtures employable generally to improve physical compatibilities, as in respect of mutual solubilities, of components present in the liquid. Contemplated solvent functions are discussed hereinafter.

As propellants, we may employ compressed inert gases such as helium, hydrogen, nitrogen and carbon dioxide, as well as liquefiable propellants, e.g. saturated hydrocarbons including methane, ethane, propane, isobutane and normal butane; also octofluorocyclobutane (Freon C 318), dimethyl ether, dichlorotetrafluoroethane (Freon 114), monochloropentafluoroethane (Freon 115) and hexafluoroethane (Freon 116).

Solid diluents as absorbents and control agents, and below about 500 microns and most usually below about 200 microns in size, include dimethyl siloxane gums (General Electric—SE30; Dow Corning—400; Union Carbide—W-95), polyethylene resins, diatomaceous earth—("Bentone"), silicates—("Cabosil"), clean cotton fibers, polypropylene resins, polyvinyl ethers-gums and semi-solids—(Gantrez "M"—General Aniline and Film), sulfates, e.g. calcium, sodium, mg., etc. and other inorganic salts which are stable in absence of water, e.g., $Fe_2O_3$, chromate salts, aluminates, cobalts salts, etc. to impart color, "Teflon," "Mylar," Buna N rubber, neoprene rubber, polyisobutylene, polybutylnitriles, and asbestos fibers.

Useable as binders or adherents are the poly pinene resins ("Piccolyte" and "Piccopale"), polysilicones, primarily saturated dimethyl, in the form of gums, rubbers and liquids, polyvinyl ethers, methyl and ethyl cellulose (e.g. "Methocel"—Dow Chemical) and saturated petroleum jellies.

Solvents may include the following: aliphatics—pentane, hexane, heptane, isopentane, etc., ethers—methyl, ethyl, diethyl, etc., liquid $CO_2$, silicone liquids—dimethyl type, cyclo hexane and saturated homologues, and light mineral oils.

Various types of formulations may be categorized as falling within the following systems packaged to maintain the luminescent agent in chemically stabilized state:

(1) luminescent agent plus propellant
(2) luminescent agent plus propellant and solvent
(3) luminescent agent, propellant and binder
(4) luminescent agent, propellant, binder and solvent
(5) luminescent agent, propellant and solid
(6) luminescent agent, propellant, solid and binder
(7) luminescent agent, propellant, solid, binder and solvent The following are illustrative examples of packaged aerosol compositions in which the luminescent agent is designated as TMAE.

EXAMPLE I

| | Weight percent |
|---|---|
| "Piccolyte" | 1.7 |
| TMAE | 4.0 |
| Silica powder (2–4 micron particles) | 8.0 |
| Hexane | 8.0 |
| Isobutane | 78.3 |

Procedure: The piccolyte is dissolved in liquid isobutane, filtered and added to the TMAE. The silica powder is dehydrated by heating, deaerated by wetting thoroughly with isobutane or hexane and added to the above solution.

The final amount of isobutane is added to complete the formula, and the container is sealed with valve in place. This type of formula gives high brilliance but short duration.

EXAMPLE II

A formula having very high intensity and easy removability can be made without resin:

| | Percent | | |
|---|---|---|---|
| TMAE | 5–10 | 5–10 | 5–10 |
| Silica or diatomaceous earth | 4–8 | 4–8 | 4–8 |
| Isobutane | Q.S. | | |
| Octafluorocyclobutane | | Q.S. | |
| Dimethylether | | | Q.S. |

EXAMPLE III

It is possible to use TMAE and propellant alone if desired in almost any proportion desired:

| | Percent | | | |
|---|---|---|---|---|
| | A | B | C | D |
| TMAE | 1–50 | 1–50 | 1–50 | 1–50 |
| Propane, n butane or isobutane | Q.S. | | | |
| Dimethylether | | Q.S. | | |
| Octafluorocyclobutane | | | Q.S. | |
| Pentafluoromonochloroethane | | | | Q.S. |

Any combination of the above will yield a workable aerosol. However, to be nonflammable, high percentages (about 80–85%) of octafluorocyclobutane or hexafluoroethane may be used.

The addition of a high viscosity dimethylpolysiloxane or petrolatum has the effect of lowering the initial intensity of light and prolonging the time the light is emitted.

EXAMPLE IV

A

| | Percent |
|---|---|
| TMAE | 15 |
| Dimethylpolysiloxane (30,000 cst.) | 40 |
| Dimethylether | 55 |

B

| | Percent |
|---|---|
| G.E. silicone gum (SE–30) | 15 |
| TMAE | 35 |
| Isobutane | 50 |

Addition of dry silica or diatomaceous earth aids in reducing flow of the deposited film at high concentration and increases light intensity.

EXAMPLE V

Polyvinylmethylether is an example of a water soluble resin binder that can be used to hold TMAE in place and yet be removable by water wash.

| | Percent |
|---|---|
| TMAE | 5 |
| Polyvinylmethylether | 2 |
| Silica | 4 |
| Dimethylether | 89 |

EXAMPLE VI

The liquefied compressed gases of low vapor pressure have limited operating temperatures of about 0° F. to +40° F. (propane, hexafluoroethane operate down to 0° F. or below, whereas octafluorocyclobutane, normal butane may operate only down to +40° F. or 50° F.). It is possible to obtain lower operating temperatures with the above propellants by combining with them a high pressure liquefied gas such as carbon dioxide, ethane, methane, or by formulating completely with medium high pressure gases (600–1000 p.s.i. @ 70° F.) using high pressure containers. Compressed inert gases may also be used in combination with liquefied gases to raise the total container pressure to lower the operating temperature. Examples are:

| | Percent | |
|---|---|---|
| TMAE | 5 | 5 |
| Silica flower | 4 | 4 |
| "Piccolyte" | 1.5 | 1.5 |
| Octafluorocyclobutane | 88.0 | 89.0 |
| Carbon dioxide | 1.5 | |
| Nitrogen | | 0.5 |

The proportions of the components are subject to wide variations according to particular properties desired. Generally the luminescent agent may range between 1% to 90% by weight, and the diluent or any diluent admixtures, between about 5% to 60%, of the total composition. Within such ranges, particular compositions may be formulated as to give such properties as maximum light intensity at shorter duration, or lesser intensity of prolonged duration, say upwards of 30 minutes. Greater intensities result from increased surface exposure to air of the luminescent agent, e.g., on solid particle diluent, whereas prolonged luminescence may result from a diluent selected, e.g., from the binder category, that partially masks the agent against oxidation.

If desired, the normal luminescent color of the deposited aerosol may be modified as by the use of colored additive materials or particles in the categories hereinabove described, as for example by the inclusion of stable dyes in liquid or viscous binder components, or the use of colored translucent or opaque solid particles, e.g., finely divided resin diluents.

We claim:

1. Packaged chemiluminescent aerosol comprising a pressurized dispensing container charged with a composition including a normally gaseous propellant and N,N,N',N' tetrakis ethylene as a luminescent agent stable in the presence of the propellant and a finely divided solid particle diluent which carries and holds particles of the luminescent agent against coalescence to have the property of distinct luminescence when deposited from the container on surfaces in exposure to air.

2. Packaged aerosol according to claim 1, in which said diluent particles are solid resinous particles.

3. Packaged aerosol according to claim 1, in which said diluent particles are solid siliceous particles.

4. Packaged aerosol according to claim 1, in which said composition includes a binder to adhere the solid particles to a surface onto which the composition is deposited from the container.

5. Packaged aerosol according to claim 1, in which said luminescent agent constitutes between about 1 and 90 weight percent of the composition.

6. Packaged aerosol according to claim 5, in which said composition includes between about 5 and 60 percent of said diluent.

7. Packaged aerosol according to claim 6, in which said diluent comprises finely divided solid particles under about 500 micron size and a binder component at least partially dissolved in the propellant.

8. Packaged aerosol according to claim 7, in which both said luminescent agent and binder component are at least partially dissolved in the propellant.

References Cited

UNITED STATES PATENTS

| | | | |
|---|---|---|---|
| 2,524,590 | 10/1950 | Boe | 252—305 |
| 3,239,406 | 3/1966 | Coffman et al. | 252—188.3 XR |
| 3,311,564 | 3/1962 | Cline | 252—188.3 |

J. D. WELSH, Primary Examiner

U.S. Cl. X.R.

252—301.2, 305, 408